United States Patent

Kobayashi et al.

[11] 4,215,540
[45] Aug. 5, 1980

[54] EXHAUST GAS PURIFYING APPARATUS FOR AUTOMOBILE MULTI-CYLINDER ENGINE

[75] Inventors: Kazuo Kobayashi; Tadataka Nakazumi; Tatsuro Oda; Kazuyuki Tanaka, all of Hiroshima, Japan

[73] Assignee: Toyo Kogyo Co., Ltd., Hiroshima, Japan

[21] Appl. No.: 917,353

[22] Filed: Jun. 20, 1978

[30] Foreign Application Priority Data

Jun. 29, 1977 [JP] Japan ............................. 52-86793[U]

[51] Int. Cl.³ .......................... F01N 3/15; F02M 25/06
[52] U.S. Cl. ......................................... 60/278; 60/293; 60/301
[58] Field of Search ........................... 60/278, 293, 301

[56] References Cited

U.S. PATENT DOCUMENTS

| | | | |
|---|---|---|---|
| 3,767,764 | 10/1973 | Dolbear | 60/301 |
| 3,984,975 | 10/1976 | Price | 60/301 |
| 4,069,666 | 1/1978 | Nakamura | 60/293 |
| 4,100,734 | 7/1978 | Ozaki | 60/278 |

Primary Examiner—Douglas Hart
Attorney, Agent, or Firm—Wenderoth, Lind & Ponack

[57] ABSTRACT

An exhaust gas purifying apparatus, for use in an automobile multi-cylinder engine of the type which has exhaust port ducts leading from engine cylinders and through which exhaust gases are emitted subsequent to combustion of an air-fuel mixture, the exhaust gas purifying apparatus having a reducing catalyst unit and an oxidizing catalyst unit disposed in a main exhaust manifold which is corrected on one side, to a first group of the exhaust port ducts and, on the other side to the atmosphere, an auxiliary exhaust manifold is connected, on one side to a second group of the exhaust port ducts and on the other side to a portion of the main exhaust manifold which is downstream from the reducing catalyst unit and upstream of the oxidizing catalyst unit. A pressure operated valve is disposed on a secondary air supply passage for introducing secondary air into the auxiliary exhaust manifold by the utilization of a pulsating flow of the exhaust gases through the auxiliary exhaust manifold, and an exhaust gas recirculating system extending between the main exhaust manifold to an intake system of the engine.

8 Claims, 1 Drawing Figure

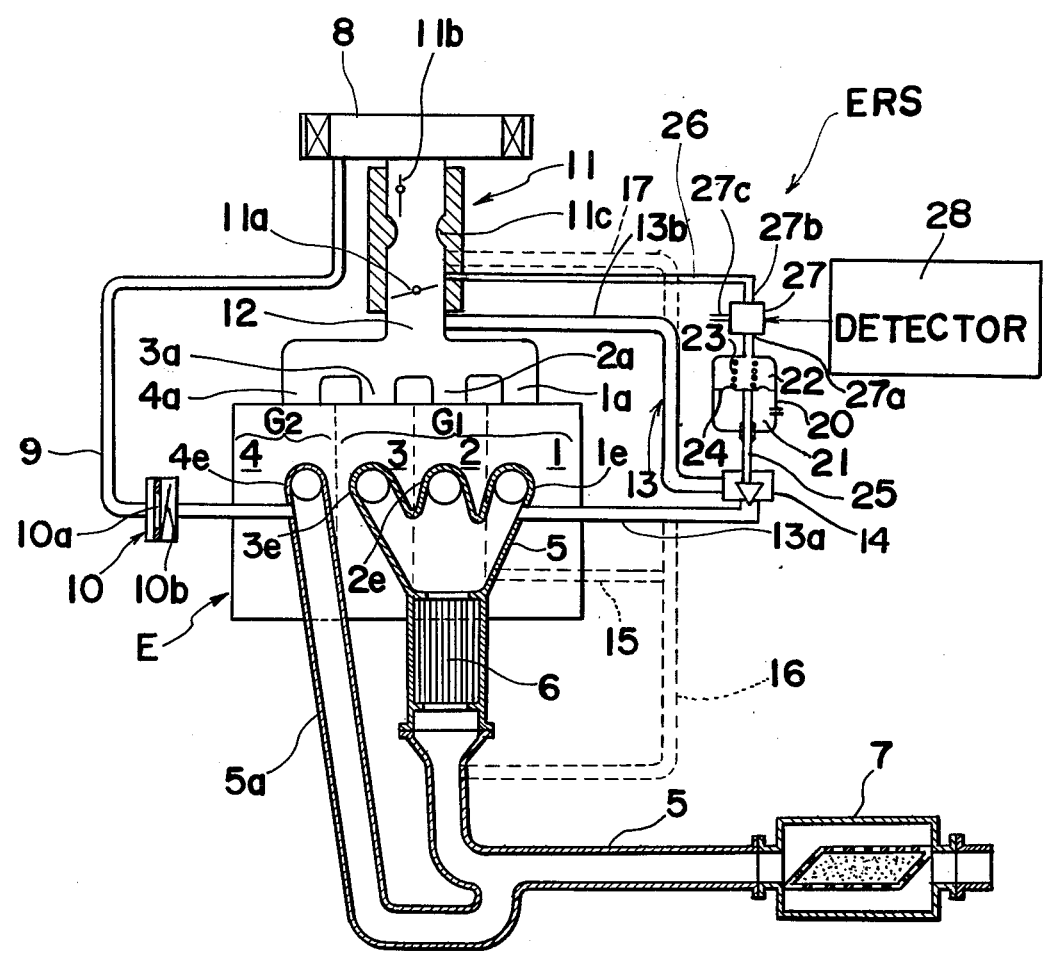

EXHAUST GAS PURIFYING APPARATUS FOR AUTOMOBILE MULTI-CYLINDER ENGINE

BACKGROUND OF THE INVENTION

The present invention is directed to an exhaust gas purification and, more particularly, to an exhaust gas purifying apparatus for an automotive vehicle engine of the type having a plurality of engine cylinders.

U.S. Pat. No. 3,908,371, which was patented on Sept. 30, 1975, discloses an exhaust gas purifying apparatus for an automotive vehicle, which uses a dual-catalyst exhaust treatment system which includes a reducing catalyst for removing an excess of oxygen and reducing nitrogen oxides in the exhaust gases and an oxidizing catalyst for oxidizing carbon monoxide and hydrocarbons in the exhaust gases. More specifically, according to the invention in the above described U.S. patent, a plurality of exhaust ducts which are respectively connected to exhaust outlets of corresponding engine cylinders merge into a single exhaust manifold having reducing and oxidizing catalyst units disposed therein so that the exhaust gases emitted from the engine cylinders subsequent to combustion of an air-fuel mixture within the engine cylinders can, after having been joined together, pass through the reducing catalyst unit and then through the oxidizing catalyst unit prior to the exhaust gases being discharged to the atmosphere. In order to enhance the oxidization of carbon monoxide and hydrocarbons in the exhaust gases which have passed through the reducing catalyst unit, the purifying apparatus of the above described U.S. patent further comprises a secondary air supply means including an engine operated pump for introducing a secondary air flow into a portion of the exhaust manifold between the reducing catalyst unit and the oxidizing catalyst unit.

In the prior art dual-catalyst purifying apparatus having a construction as described above, the engine operated pump for introducing the secondary air into the manifold portion between the reducing and oxidizing catalyst units is required. The reason for this is that all of the exhaust ducts, which are respectively connected to the individual engine cylinders, are bundled into the single exhaust manifold at a position upstream of the reducing catalyst unit in terms of the direction of flow of the exhaust gases towards the atmosphere. More specifically, as is well known to those skilled in the art, automobile exhaust gases which are successively emitted from the engine cylinders generally flow through an exhaust manifold towards the atmosphere in a substantially pulsating manner with the pressure inside the exhaust manifold alternately increasing and decreasing because of the different timing of firing of air-fuel mixtures within the respective engine cylinders.

While it is well known to those skilled in the art that if all of the exhaust gases successively emitted from the individual engine cylinders are allowed to pass through the reducing catalyst unit such as in the prior art dual-catalyst purifying apparatus, the pulsating characteristic of flow of the exhaust gases through the exhaust manifold downstream of the reducing catalyst unit is weakened so that the prior art dual-catalyst purifying apparatus cannot make use of the pulsating characteristic to supply the secondary air into the exhaust manifold portion downstream of the reducing catalyst unit and upstream of the oxidizing catalyst unit, and an external pumping means, such as the engine operated pump, is accordingly required.

The use of the engine operated pump results in a substantial increase in the cost of manufacture of the purifying apparatus which in turn affects the cost of manufacture of an automotive vehicle equipped with such purifying apparatus. In addition, since the engine operated pump is driven by the power output shaft of the engine, the power output shaft has an unnecessary load added which substantially reduces the power output of the engine as a whole.

The copending U.S. patent application Ser. No. 891,111, which was filed on Mar. 28, 1978, in which two of the inventors therein are the same inventors as some of the present invention and the noted application assigned to the same assignee of the present invention, discloses a dual-catalyst purifying apparatus which substantially eliminates the disadvantages and inconveniences inherent in the above described prior art purifying apparatus. According to the invention in the copending U.S. patent application, a plurality of exhaust ducts are respectively connected to cylinders of the engine to allow an outward flow and the cylinders are divided into first and second groups, the exhaust ducts of the first group are connected to a main exhaust manifold having reducing and oxidizing catalyst units disposed therein while the exhaust ducts of the second group are connected to a portion of the main exhaust manifold between the reducing and oxidizing catalyst units through an auxiliary exhaust manifold.

For supplying a secondary air necessary to enhance oxidization of the exhaust gases during the passage of the exhaust gases through the oxidizing catalyst unit, there is a portion of the auxiliary exhaust manifold connected to a source of secondary air through a pressure operated valve which is in the form of a reed valve.

The dual-catalyst purifying apparatus disclosed in the copending U.S. patent application is designed so that, since there is no substantial resistance to flow of the exhaust gases in the auxiliary exhaust manifold, the exhaust gases which are successively emitted from the exhaust ducts of the second group, at intervals which are determined by the timing of successive firing of the air-fuel mixture within the respective engine cylinders, flow through the auxiliary exhaust manifold in a pulsating manner with the pressure alternately increasing and decreasing and this pulsating flow of the exhaust gases through the auxiliary exhaust manifold being used to repeatedly open and close the reed valve.

The dual-catalyst purifying apparatus which is disclosed in the copending U.S. patent application is satisfactory for removing or reducing the monoxides and hydrocarbons contained in the exhaust gases to be discharged to the atmosphere, and reduces them in an appreciably great amount when compared to the prior art dual-catalyst purifying apparatus. However, in the dual-catalyst purifying apparatus disclosed in the copending U.S. patent application, since the exhaust gases emitted from the exhaust ducts of the second group do not flow through the reducing catalyst unit, but only through the oxidizing catalyst unit, the employment of an extra means for reducing or removing the nitrogen oxides is required.

SUMMARY OF THE INVENTION

Accordingly, the present invention has been developed with a view to substantially eliminate the disadvantages and inconveniences inherent in the prior art purifying apparatuses of the types described above and is intended to provide an improved dual-catalyst purifying apparatus for an automotive vehicle engine of a type having a plurality of engine cylinders, wherein the pulsating characteristic of flow of the exhaust gases is effectively and advantageously utilized for supplying a secondary air into a portion of the exhaust manifold between the reducing and oxidizing catalyst units on one hand and an exhaust gases recirculating system is utilized to reduce the amount of nitrogen oxides in the exhaust gases on the other hand.

Another important object of the present invention is to provide an improved dual-catalyst purifying apparatus of the type described above which does not require the provision of expensive and power-consuming pumping means as employed in the prior art apparatus.

A further object of the present invention is to provide an improved dual-catalyst purifying apparatus of the type described above, wherein the installation of the exhaust gas recirculating system does not require an unusual manufacturing procedure different from those currently being employed.

For the purpose of accomplishing these and other objects of the present invention, the apparatus of the present invention is applied to an automotive vehicle engine of a type having a plurality of engine cylinders each having intake and outlet port means communicating with a combustion chamber within the corresponding engine cylinder, an intake manifold having a carburetor and a throttle valve and also having one end connected to a source of air and the other end connected to the intake port means of the engine cylinders, the outlet port means of the engine cylinders being divided into first and second groups.

A main exhaust manifold having reducing and oxidizing catalyst units disposed therein has one end connected to the outlet port means of the first group and the other end connected to the atmosphere. The outlet port means of the second group is connected to one end of an auxiliary exhaust manifold, the other end of which is connected to a portion of the main exhaust manifold between the reducing and oxidizing catalyst units. For supplying a secondary air which is necessary to enhance oxidization of the exhaust gases during the pasage of the exhaust gases through the oxidizing catalyst unit, a portion of the auxiliary exhaust manifold is connected through a pressure operated valve, such as a reed valve, to a source of secondary air which may be the source of air to which the intake port means are in communication through the intake manifold.

In accordance with the present invention, there is further provided an exhaust gas recirculation system made up of a passage means having a regulator disposed at a substantially intermediate portion thereof, one end of the passage means being connected to the intake manifold while the other end of the passage means is connected to a portion of the main exhaust manifold upstream of the junction between the auxiliary exhaust manifold and the main exhaust manifold and also upstream of the oxidizing catalyst unit.

It is generally understood that, in order for the reducing catalyst to operate, automobile exhaust gases to be reacted in the presence of the reducing catalyst should be of a nature ready to be reduced in the presence of such reducing catalyst while, in order for the oxidizing catalyst to operate, the gases should be of a nature ready to be oxidized in the presence of oxygen. In view of this, in the dual-catalyst purifying apparatus shown in the present invention, the air-fuel mixture to be introduced into some of the engine cylinders, which are connected to the outlet port means of the first group, can be proportioned to be an air-to-fuel ratio which is substantially equal to or appreciably richer than a stoichiometric air-to-fuel ratio, so that the exhaust gases subsequently emerging from the outlet port means of the first group into the main exhaust manifold are of a type which can be readily reduced as they pass through the reducing catalyst unit. This can be achieved by the use of, for example, at least two carburetors through which the air-fuel mixture, proportioned to a ratio substantially equal to or appreciably richer than the stoichiometric air-to-fuel ratio, and the air-fuel mixture of a ratio different from that of the first mentioned air-fuel mixture can be respectively introduced into some of the engine cylinders and then exhausted into the outlet port means of the first group, and the other of the same engine cylinders can be exhausted to the outlet port means of the second group. So far as the exhaust gases being exhausted from the outlet port means of the second group are concerned, they may have a tendency to be either ready to be reduced in the presence of the reducing catalyst or ready to be oxidized in the presence of the oxidizing catalyst. Even though the exhaust gases emerging from the outlet port means of the second group has a tendency to be ready to be reduced in the presence of the reducing catalyst, that is, they are similar in nature the exhaust gases emerging from the outlet port means of the first group, such as in the case where a single carburetor is employed and the air-fuel mixture of a ratio substantially equal to or appreciably richer than the stoichiometric air-to-fuel ratio is equally introduced into all of the engine cylinders, no substantial reduction in overall purification of the exhaust gases takes place because the secondary air is introduced in the manner as hereinbefore described so that a mixture of the exhaust gases which is passed through the reducing catalyst unit, and those supplied through the auxiliary exhaust manifold can be modified so as to have a tendency to be ready to be oxidized as they subsequently pass through the oxidizing catalyst unit.

BRIEF DESCRIPTION OF THE DRAWING

These and other objects and features of the present invention will become apparent from the following description taken in conjunction with a preferred embodiment thereof with reference to the accompanying drawing which is a schematic side sectional view of a four-cylinder vehicle engine embodying the present invention.

DETAILED DESCRIPTION OF THE INVENTION

Referring to the accompanying drawing, there is shown an automobile internal combustion engine E having any known construction and having four engine cylinders 1, 2, 3 and 4 which have respective intake ports (not shown) which communicate through intake ducts 1a, 2a, 3a and 4a with an intake manifold 12. The intake manifold 12 includes a carburetor 11 mounted thereon, the carburetor 11 includes a throttle valve 11a, a choke valve 11b and a venturi 11c and operates as a source of air-fuel mixture wherein fresh air and fuel, which are respectively supplied from the atmosphere through an air cleaner 8 and a fuel tank (not shown), are mixed in known fashion in a predetermined ratio which is substantially equal to or appreciably richer than the stoichiometric air-to-fuel ratio.

The engine cylinders 1, 2, 3 and 4 also have respective exhaust ports to which associated exhaust ducts 1e, 2e, 3e and 4e are connected as shown. These exhaust ducts 1e, 2e, 3e and 4e, which extend from the respective engine cylinders 1, 2, 3 and 4, are divided into two groups G1 and G2; the first group G1 including the exhaust ducts 1e, 2e and 3e and the second group G2 including the exhaust duct 4e.

As illustrated, the air-fuel mixture, which is proportioned to be a mixture ratio which is appreciably richer than the stoichiometric air-to-fuel ratio, is supplied equally into the individual engine cylinders 1, 2, 3 and 4 and, therefore, portions of exhaust gases subsequently exhausted from the respective engine cylinders 1 to 4 are similar, in quality or nature, to each other. This is particularly advantageous in that the engine intake system can be simplified by requiring only one carburetor 11 as shown. However, it is preferred that only the air-fuel mixture to be introduced into the engine cylinders 1, 2 and 3 associated with the exhaust ducts 1e, 2e and 3e of the first group G1 be proportioned to be of such a mixture ratio such that the exhaust gases subsequently emerging from the respective engine cylinders 1, 2 and 3 are of a nature ready to be reduced in the presence of a reducing catalyst, while the air-fuel mixture to be introduced into the engine cylinder 4 associated with the exhaust duct 4e of the second group G2 may be of a mixture ratio equal to or different from that of the air-fuel mixture to be supplied into the engine cylinders 1, 2 and 3. This particular modification, however, requires the use of two carburetors in the intake system.

The exhaust ducts 1e, 2e and 3e are connected together so that the exhaust gases flowing in the respective ducts 1e, 2e and 3e can mix with each other and subsequently flow into a main exhaust manifold 5 which has a reducing catalyst unit 6 and an oxidizing catalyst unit 7 disposed therein. The units 6 and 7 are respectively positioned at upstream and downstream sides with respect to the direction of flow of the exhaust gases towards the atmosphere and away from the engine E. The reducing catalyst unit 6 may employ either a reducing catalyst or a three-way catalyst of, preferably, the monolithic type, and which is capable of assisting in reduction of the exhaust gases when the gases contact the catalyst. The oxidizing catalyst unit may employ either an oxidizing catalyst or a three-way catalyst of, preferably, the pellet type, and which is capable of assisting oxidization of the exhaust gases when the gases contact the catalyst.

The exhaust duct 4e of the second group G2 is connected to an auxiliary exhaust manifold 5a which may be a piping element which is separate of the exhaust duct 4e or an integral extension of the exhaust duct 4e. This auxiliary exhaust manifold 5a has one end connected to the exhaust duct 4e and has the other end connected to a portion of the main exhaust manifold 5 between the reducing and oxidizing catalyst units 6 and 7 and a substantially intermediate portion connected, preferably through the air cleaner 8, to the atmosphere by way of a secondary air supply passage 9 which has a pressure operated valve, for example, a reed valve 10 disposed therein. The reed valve 10 is of a type having an aperture 10a and a reed member 10b which is adapted to open and close the aperture 10a, and is disposed in the secondary air supply passage 9 so that, when a negative pressure and a positive pressure are alternately developed in the auxiliary exhaust manifold 5a during the pulsating flow of the exhaust gases therethrough, the reed member 10b is correspondingly alternately displaced to open and close the aperture 10a for both allowing and interrupting the supply of the secondary air into the portion of the main exhaust manifold between the catalyst units 6 and 7, respectively. It is to be noted that, during the condition in which the reed member 10b is held in position to close the aperture 10a, no exhaust gases flow through the reed valve 10 into a portion of the supply passage 9 remote from the manifold 5a because the reed valve operates as a check valve.

In the construction as described, it is clear that the exhaust gases exhausted from the engine cylinders 1, 2 and 3 are collected together as they enter the main exhaust manifold 5 and then flow towards the atmosphere through the reducing catalyst unit 6 and then through the oxidizing catalyst unit 7. As hereinbefore described, as the exhaust gases flow through the reducing catalyst unit 6, nitrogen oxides which are contained in the exhaust gases are reduced when they come in contact with the reducing catalyst and, as the exhaust gases are subsequently passed through the oxidizing catalyst unit 7, carbon monoxides and hydrocarbons which are still contained in the exhaust gases are oxidized by contacting the oxidizing catalyst. On the other hand, since there is no resistance to the flow of the exhaust gases which are exhausted from the engine cylinder 4e into the auxiliary exhaust manifold 5a, the secondary air can be sucked into the exhaust manifold 5a by using the pulsating flow of the exhaust gases in the auxiliary exhaust manifold 5a as hereinbefore described without the pulsating characteristic of the flow of such exhaust gases being weakened. The exhaust gases flowing in the exhaust manifold 5a and containing the secondary air which is supplied thereto through the reed valve 10 as hereinbefore described subsequently mix with the exhaust gases flowing from the reducing catalyst unit 6 and are finally passed through the oxidizing catalyst unit 7. It is to be noted that, because of the secondary air supplied in the manner as hereinbefore described, a mixture of the exhaust gases from the engine cylinders 1, 2 and 3 and that from the engine cylinder 4 have characteristics such that they are to be oxidized by oxidization as they pass through the oxidizing catalyst unit 7. Therefore, the hydrocarbons and carbon monoxides which are contained in the exhaust gases as a whole can be re-burned to provide a substantially purified exhaust gas which is subsequently discharged to the atmosphere.

An essential feature of the present invention is that the dual-catalyst exhaust gas purifying apparatus further comprises an exhaust gas recirculating system, (hereinafter designated by ERS). This exhaust gas recirculating system ERS comprises a recirculating passage 13 made up of passage portions 13a and 13b which are connected to each other by a flow control valve 14. As illustrated, a free end of the passage portion 13a is connected to any one of the exhaust ducts, for example, the exhaust duct 1e while a free end of the passage portion 13b is connected to a portion of the intake manifold 12 which is downstream of the throttle valve 11a and upstream of the junction between the intake manifold 12 and the intake ducts 1a, 2a, 3a and 4a.

The flow control valve 14 on the recirculating passage 13 serves to throttle or completely interrupt the flow of a portion of exhaust gases which flow from the exhaust system to the intake system through the recirculating passage 13. This flow control valve 14 is controlled by a diaphragm unit 20 which is constructed so as to have a constant pressure chamber 21 and a negative pressure chamber 22 which includes a diaphragm 24 within a casing, a connecting rod 25 having one end axially movably extending through the constant pressure chamber 21 and rigidly secured to the diaphragm 24 and the other end integrally formed with, or rigidly connected to, a valve element of the control valve 14, and a biasing spring 23 housed within the negative pressure chamber 22 and serving to bias the diaphragm 22 and the connecting rod 25 in one direction so that the valve element of the control valve 14 can be held in a position for interrupting the flow of the exhaust gases from the passage portion 13a to the passage portion 13b via the control valve 14.

The negative pressure chamber 22 of the diaphragm unit 20 is connected to the carburetor 11, for example, to a portion of the intake manifold 12 which is downstream of the venturi 11c through a fluid duct 26 which has a solenoid operated, three-way valve 27 disposed therein. The three-way valve 27 has ports 27a and 27b, which are respectively connected to a portion of the fluid duct 26 which is adjacent to the diaphragm unit 20 and another portion of the fluid duct 26 which is adjacent to the carburetor 11, and an air bleed port 27c which is connected to the atmosphere.

The three-way valve 27 has a solenoid which is adapted to be energized by a signal from an engine condition detecting unit 28 in such a manner that only when no recirculation of that portion of the exhaust gases from the exhaust system into the intake system is required or, for example, only during a cold start of the engine in which the engine starts while its temperature is low, can the three-way valve 27 be held in position to connect the port 27a to the port 27c, or more specifically, to communicate the negative pressure chamber 22 to the atmosphere, in response to the signal from the detecting unit 28. During this condition, the valve element of the control valve 14 is held in position to interrupt the flow of that portion of the exhaust gases from the passage portion 13a to the passage portion 13b.

On the other hand, in the absence of a signal from the detecting unit 28, that is, during any of the other engine conditions, the three-way valve 27 is held in position to connect the port 27a to the port 27b, or more specifically, to communicate the negative pressure chamber 22 to the intake manifold 12. In this condition, air within the negative pressure chamber 22 is drawn into the intake manifold 12 by the action of a negative pressure which is developed in the intake manifold 12 and, therefore, the diaphragm 24 is, together with the connecting rod 25, displaced in the opposite direction, against the biasing spring 23, with the valve element of the control valve 14 consequently held in a position for establishing an open passage between the passage portions 13a and 13b.

As hereinbefore described, the control valve 14 selectively opens and closes the recirculating passage 13, or more particularly, selectively permits and interrupts the flow of that portion of the exhaust gases from the exhaust system into the intake system, and further controls, during the opening of the control valve 14, the effective flow area of the passage 13 according to the negative pressure which is developed in the carburetor 11 or the intake manifold 12.

The exhaust gas recirculating system ERS operating in the above described manner is effective to lower the maximum combustion temperature within the engine cylinders 1 to 4 because of the mixing of that portion of the exhaust gases with a fresh air-fuel mixture within the engine cylinders. As is well known to those skilled in the art, the amount of the nitrogen monoxides emitted from the engine depends upon the maximum combustion temperature and, therefore, the lower the maximum combustion temperature, the smaller the amount of the nitrogen monoxides.

It is to be noted that, in the exhaust gas recirculating system ERS of the described above construction since that portion of the exhaust gases is allowed to enter the recirculating passage 13 at a position upstream of the junction between the auxiliary exhaust manifold 5a and the main exhaust manifold 5, specifically, since the free end of the passage portion 13a opens into the exhaust manifold 5 at a position upstream of the junction between the auxiliary exhaust manifold 5a and the main exhaust manifold 5, no substantial quantities of secondary air which is supplied into the auxiliary exhaust manifold 5a and then into the main exhaust manifold 5 enter the recirculating passage 13. Therefore, the possibility that the amount of the secondary air supplied to the oxidizing catalyst unit 7 together with the exhaust gases will being less than the required amount which would result in reduction in NOx reducing performance of the exhaust gas recirculating system ERS is minimized.

In the foregoing description of the present invention, the free ends of the respective passage portions 13a and 13b have been described as being connected to any one of the exhaust ducts 1e, 2e and 3e of the first group G1 and the portion of the intake manifold 12 which is upstream of the junction between the intake manifold 12 and the intake ducts 1a, 2a, 3a and 4a and downstream of the throttle valve 11a. However, as far as the passage portion 13a is concerned, the free end of the passage portion may be connected to a portion of the exhaust manifold 5 which is either upstream from the reducing catalyst unit 6 as shown by the pipe 15, which is shown by dashed lines, or which is between the reducing catalyst unit 6 and the junction of the auxiliary exhaust manifold 5a to the main exhaust manifold 5 as shown by the dashed line pipe 16. On the other hand, as far as the passage portion 13b is concerned, the free end of the passage portion may be connected to a portion of the intake manifold 12 which is upstream from the throttle valve 11a as shown by the dashed line pipe 17, or to the intake manifold 12 through the air cleaner 8, or to any one of the intake ducts 1a, 2a, 3a and 4a, preferably, the intake duct 4a, depending upon the amount of nitrogen monoxides required to be reduced.

In particular, where the free end of the passage portion is connected to the portion of the main exhaust manifold 5 between the reducing catalyst unit 6 and the junction of the auxiliary exhaust manifold 5a to the main exhaust manifold 5 as shown by the dashed line pipe 16, and if the reducing catalyst unit 6 employs the three-way catalyst, an additional advantage is that, since the exhaust gases having passed through the reducing catalyst unit 6 have a smaller amount of carbon monoxide and hydrocarbons than that of the exhaust gases prior to being passed through the reducing catalyst unit 6, there is virtually no possibility of the carbon components clogging the recirculating passage 13.

In any event, the number of the exhaust ducts of the first group may not be always limited to three such as shown in the drawing, but in the case of the four-cylinder engine, it is preferable that the number of the exhaust ducts of the first group be three, assuming that it satisfies the requirement that the number of the exhaust ducts of the first group be equal to or greater than half of the total number of the engine cylinders.

Furthermore, in order to facilitate warm-up of the oxidizing catalyst unit 7 during cold starting of the engine E, it is possible to supply the secondary air either into some, or all, of the exhaust ducts 12, 2e and 3e of the first group G1, or into a portion of the main exhaust manifold 5 which is upstream of the reducing catalyst unit 6 so that the exhaust gases emitted from the engine cylinders 1, 2 and 3 through the exhaust ducts 1e, 2e and 3e can become of a nature ready to be oxidized. Even if this arrangement is employed, there is no possibility that the amount of the secondary air supplied to the oxidizing catalyst unit 7, together with the exhaust gases, will be less than the required amount which would result in reduction in NOx reducing performance of the exhaust gas recirculating system ERS, since during cold starting of the engine, the control valve 14 is in a position for interrupting the supply of the exhaust gases from the exhaust system back into the intake system through the recirculating passage 13 as hereinbefore described.

Such changes and modifications are to be understood as being included within the true scope of the present invention unless they depart therefrom.

We claim:

1. An exhaust gas purifying apparatus for use in an automotive vehicle engine of a type having a plurality of engine cylinders each having intake and outlet port means connected to a combustion chamber within the corresponding engine cylinder, said engine having intake manifold means, said intake manifold means having one end connected to said intake port means of respective engine cylinders and the other end in open communication with atmosphere through a carburator mounted thereon, said carburator having a throttle valve for controlling the flow of air-fuel mixture to said cylinders, the outlet port means of the respective engine cylinders exhausting exhaust gases to the outside of the engine subsequent to combustion of the air-fuel mixtures which have been introduced into the associated combustion chambers of the engine cylinders, said exhaust gas purifying apparatus comprising:
 a main exhaust passage means having a reducing catalyst therein and having an oxidizing catalyst therein downstream of the reducing catalyst;
 an auxiliary exhaust passage means between the reducing catalyst and the oxidizing catalyst;
 said outlet port means being divided into first and second groups, the outlet port means of the first group being connected to said main exhaust passage means and the outlet port means of the second group being connected to said auxiliary exhaust passage means, the number of said outlet port means of the first group being equal to or greater than half the total number of the engine cylinders;
 a secondary air supply passage means having one end connected to said auxiliary exhaust passage means and the other end being in open communication with a source of secondary air;
 a pressure operated valve located in said secondary air supply passage means, said exhaust gases which flow in said auxiliary exhaust passage means flowing in a pulsating flow and said pressure operated valve being opened and closed in response to said pulsating flow in said auxiliary exhaust passage means for admitting and closing off a flow of secondary air into said secondary air supply passage means; and
 exhaust gas recirculating passage means, one end of said intake manifold means being divided into a plurality of intake ducts which are connected to respective intake port means of respective engine cylinders, one end of said recirculating passage means being connected to said intake manifold means downstream from said throttle valve and upstream of said intake ducts and downstream of said throttle valve on said carburator, and the other end of said exhaust gas recirculating passage means being connected to said main exhaust passage means upstream of said connection of said main exhaust passage means and said auxiliary exhaust passage means for redirecting a flow of said exhaust gases back into all of said cylinders.

2. An exhaust gas purifying apparatus as claimed in claim 1, wherein the engine is a four cylinder engine and said first group of outlet port means comprises three outlet ports.

3. An exhaust gas purifying apparatus as claimed in claim 1, wherein the portion of said main exhaust passage means to which said one end of said recirculating passage means is connected is located between the portion of said main exhaust passage means where said auxiliary passage means and said reducing catalyst unit is connected.

4. An exhaust gas purifying apparatus as claimed in claim 1, wherein the portion of said main exhaust passage means to which said one end of the recirculating passage means is connected is located between said outlet port means of said respective engine cylinders and said reducing catalyst unit.

5. An exhaust gas purifying apparatus as claimed in claim 1, wherein the one end of said main exhaust passage means which is adjacent the engine is divided into exhaust ducts and is connected to said outlet port means through said exhaust ducts, and wherein the portion of said main exhaust passage means to which said one end of said recirculating passage means is connected is located between said reducing catalyst unit and the point where said one end of the main exhaust passage means is divided into said exhaust ducts.

6. An exhaust gas purifying apparatus as claimed in claim 1, wherein one end of said main exhaust passage means adjacent to the engine is divided into exhaust ducts and is connected to said outlet port means through said exhaust ducts, and wherein the portion of said main exhaust passage means to which said one end of said recirculating passage means is connected is comprised of any one of said exhaust ducts being connected respectively to said outlet port means of said first group.

7. An exhaust gas purifying apparatus as claimed in claim 1, wherein said recirculating passage means has a flow control means having a control valve therein which is responsive to a negative pressure which is developed in the intake manifold means by said pulsating flow for causing said control valve to operate.

8. An exhaust gas purifying apparatus as claimed in claim 7, wherein said control valve is closed for closing said recirculating passage means and thereby interrupting the flow of a portion of said exhaust gases, during starting of the engine when it is cold.

* * * * *